US010227898B2

(12) United States Patent
Kawashima

(10) Patent No.: US 10,227,898 B2
(45) Date of Patent: Mar. 12, 2019

(54) MULTI-VALVE STEAM VALVE AND STEAM TURBINE

(71) Applicant: MITSUBISHI HEAVY INDUSTRIES COMPRESSOR CORPORATION, Tokyo (JP)

(72) Inventor: Hirokazu Kawashima, Hiroshima (JP)

(73) Assignee: Mitsubishi Heavy Industries Compressor Corporation, Tokyo (JP)

( * ) Notice: Subject to any disclaimer, the term of this patent is extended or adjusted under 35 U.S.C. 154(b) by 636 days.

(21) Appl. No.: 14/770,351

(22) PCT Filed: Mar. 27, 2013

(86) PCT No.: PCT/JP2013/059077
§ 371 (c)(1),
(2) Date: Aug. 25, 2015

(87) PCT Pub. No.: WO2014/155579
PCT Pub. Date: Oct. 2, 2014

(65) Prior Publication Data
US 2016/0010508 A1 Jan. 14, 2016

(51) Int. Cl.
*F01K 13/02* (2006.01)
*F01D 17/18* (2006.01)
(Continued)

(52) U.S. Cl.
CPC .............. *F01K 13/02* (2013.01); *F01D 17/18* (2013.01); *F16K 1/52* (2013.01); *F16K 31/52408* (2013.01); *F05D 2220/31* (2013.01)

(58) Field of Classification Search
CPC .......... F01D 17/18; F01D 17/45; F01K 13/02; F05D 2220/31; F16K 1/52; F16K 31/52408
(Continued)

(56) References Cited

U.S. PATENT DOCUMENTS 3,763,894 A * 10/1973 Meyer .................. F01D 17/145
137/630.19
4,193,879 A * 3/1980 Leach .................... B01J 19/121
359/345
4,456,032 A 6/1984 Straslicka

FOREIGN PATENT DOCUMENTS

CH          296440 A    2/1954
DE          767163 C   12/1951
(Continued)

OTHER PUBLICATIONS

Extended European Search Report dated Jan. 29, 2016 in counterpart European Application No. 13879843.4.
(Continued)

*Primary Examiner* — Mark Laurenzi
*Assistant Examiner* — Paul Thiede
(74) *Attorney, Agent, or Firm* — Birch, Stewart, Kolasch & Birch, LLP

(57) ABSTRACT

A multi-valve-type steam valve provided with a plurality of control valves widening a flow path as valve bodies are gradually separated from valve seats by valve shafts being driven in one direction and allowing steam to flow in by allowing the plurality of control valves to reach an open state in order, the multi-valve-type steam valve being configured such that at least the control valve reaching the open state first among the plurality of control valves have a smaller steam inflow amount during the driving in the one direction from a closed state than the other control valves.

10 Claims, 9 Drawing Sheets

(51) Int. Cl.
*F16K 1/52* (2006.01)
*F16K 31/524* (2006.01)

(58) Field of Classification Search
USPC .................................... 415/151; 137/630.19
See application file for complete search history.

(56) References Cited

FOREIGN PATENT DOCUMENTS

| | | |
|---|---|---|
| DE | 40 23 900 A1 | 1/1992 |
| JP | 50-85827 U | 7/1975 |
| JP | 51-144804 A | 12/1976 |
| JP | 55-19967 A | 2/1980 |
| JP | 61-265310 A | 11/1986 |
| JP | 62-121806 A | 6/1987 |
| JP | 62-159704 A | 7/1987 |
| JP | 63-82002 U | 5/1988 |
| JP | 3-85302 A | 4/1991 |
| JP | 5-36601 B2 | 5/1993 |
| JP | 8-218806 A | 8/1996 |
| JP | 9-105311 A | 4/1997 |
| JP | 10-9407 A | 1/1998 |
| JP | 10-176502 A | 6/1998 |
| JP | 10-274005 A | 10/1998 |
| JP | 2000-18005 A | 1/2000 |
| JP | 2001-263003 A | 9/2001 |
| JP | 2002-97903 A | 4/2002 |
| JP | 2004-225667 A | 8/2004 |
| JP | 2005-291113 A | 10/2005 |
| JP | 2007-239663 A | 9/2007 |
| JP | 2010-48216 A | 3/2010 |

OTHER PUBLICATIONS

Japanese Office Action, dated Jun. 14, 2016, for Japanese Application No. 2015-507782, along with an English translation.
International Search Report and Written Opinion of the International Searching Authority (Forms PCT/ISA/237 and PCT/ISA/210), dated Jun. 18, 2013, for International Application No. PCT/JP2013/059077, with an English translation.

* cited by examiner

PRIOR ART FIG. 11
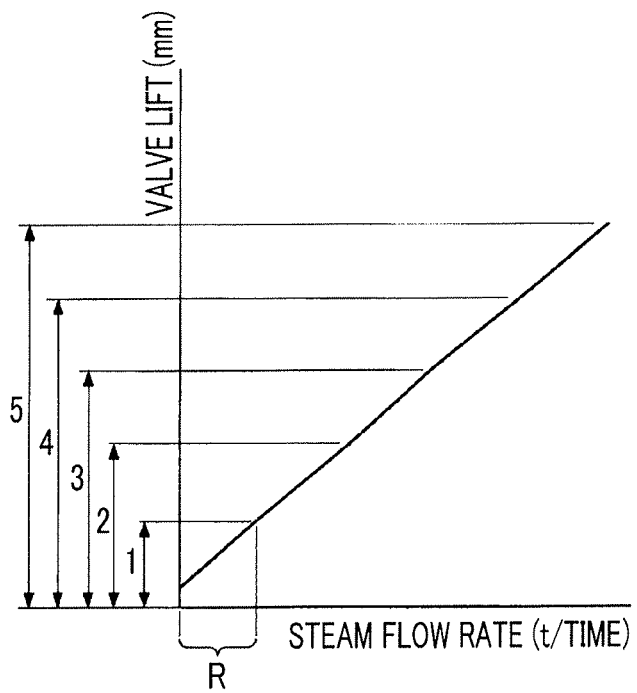

MULTI-VALVE STEAM VALVE AND STEAM TURBINE

TECHNICAL FIELD

The present invention relates to a multi-valve-type steam valve that adjusts the amount of steam which flows in, and a steam turbine.

BACKGROUND ART

In a case where a steam turbine in a stop state is put into operation, a warm-up operation is performed with rotation below a rated speed because a rotor is distorted due to its own weight during the long-term stop and the distortion has to be corrected.

As illustrated in FIG. 10, a multi-valve-type steam valve 106 that is provided with a plurality of control valves is used in the warm-up operation. An inner bar 13 that is disposed in a steam chamber to which steam is supplied and a plurality of control valves 114 that are mounted on the inner bar 13 constitute the multi-valve-type steam valve 106. The control valves 114 are driven in a vertical direction when the inner bar 13 is operated by supporting rods 17. The plurality of control valves 114 are set to reach an open state in order when the inner bar 13 is moved upward.

CITATION LIST

Patent Literature

[PTL 1] Japanese Unexamined Patent Application Publication No. 10-9407

SUMMARY OF INVENTION

Technical Problem

FIG. 11 is a graph illustrating a relationship between a steam flow rate and a valve lift amount (valve lift). The numbers of one to five in the graph show which one of the control valves 114 among the first control valve 114 to the fifth control valve 114 is lifted at a corresponding lift amount.

In this multi-valve-type steam valve according to the related art, the flow rate range R of the control valve 114 reaching the open state first is wide as illustrated in FIG. 11, and thus controllability during low-speed rotation causes a problem during the warm-up operation. It is known that governing may become difficult because of the small rotary inertia (GD2) of the rotor particularly in a case where only the turbine is operated as in a test operation.

Solution to Problem

According to an aspect of the present invention, there is provided a multi-valve-type steam valve including a plurality of control valves widening a flow path as valve bodies are gradually separated from valve seats by driving valve shafts in one direction, in which steam is allowed to flow in by allowing the plurality of control valves to reach an open state in order, and the multi-valve-type steam valve being configured such that at least the control valve reaching the open state first among the plurality of control valves has a smaller steam inflow amount when being driven in the one direction from a closed state than the other control valves.

According to the configuration described above, the steam flow rate of the control valve reaching the open state first from the fully-closed state to the fully-open state decreases. In other words, controllability of the multi-valve-type steam valve during fine speed adjustment is improved because of the narrow flow rate range of the control valve.

In the multi-valve-type steam valve, it is preferable that the valve body of the at least the control valve reaching the open state first is smaller in size than the valve bodies of the other control valves and is formed for the steam inflow amount to be decreased.

According to the configuration described above, the driving force for the operation of the control valve can be reduced. In other words, the thrust force of the steam that is applied to the valve body decreases since the valve body is small in size, and thus the power for the driving of the valve body can be reduced.

In the multi-valve-type steam valve, the valve body of the at least the control valve reaching the open state first may have a pilot valve connected to the valve shaft, and a valve body main body which abuts against the valve seat and in which a space accommodating the pilot valve therein, a steam guide hole allowing the space and an upstream-side flow path to communicate with each other, and a steam discharge hole allowing the space and a downstream-side flow path to communicate with each other are formed, the pilot valve may block the steam guide hole and the steam discharge hole in the closed state, the upstream-side flow path and the downstream side may communicate with each other via the space by driving the valve shaft in the one direction from the closed state to cause the steam guide hole and the steam discharge hole to be released, and the pilot valve may further lift the valve body to be separated from the valve seat when the valve shaft is further driven in the one direction.

According to the configuration described above, the main valve and the pilot valve constitute the control valve, and thus control by the pilot valve is allowed. In other words, in other words, the range of the flow rate of the control valve with respect to the valve lift can be narrowed, and controllability of the multi-valve-type steam valve during fine speed adjustment is improved.

In the multi-valve-type steam valve, it is preferable that the valve shaft of the valve body may pass from below through a valve shaft hole bored in an inner bar arranged in the flow path, and a diameter-enlarged portion formed above the valve shaft is lifted via the inner bar and the valve body may be allowed to be moved forward and backward with respect to the valve seat so that the steam flows in.

According to the configuration described above, governing can be facilitated even at a low rotation speed.

The multi-valve-type steam valve may further include a connecting arm arranged outside the flow path and having a plurality of cams driving the valve shafts of the plurality of control valves, in which the steam may be allowed to flow in by rotating the connecting arm.

According to the configuration described above, steam guiding using a plurality of pipes is allowed even in a case where the pressure and temperature of steam temperature are high.

According to another aspect of the present invention there is provided a steam turbine including the multi-valve-type steam valve of the above described aspect.

Advantageous Effects of Invention

According to the present invention, the steam flow rate of the control valve reaching the open state first from the fully-closed state to the fully-open state decreases. In other words, controllability of the multi-valve-type steam valve during fine speed adjustment is improved because of the narrow flow rate range of the control valve.

BRIEF DESCRIPTION OF DRAWINGS

FIG. 11 is a graph illustrating a relationship between a steam flow rate and a valve lift amount regarding a steam turbine according to the related art.

DESCRIPTION OF EMBODIMENTS

First Embodiment

Figure 1:
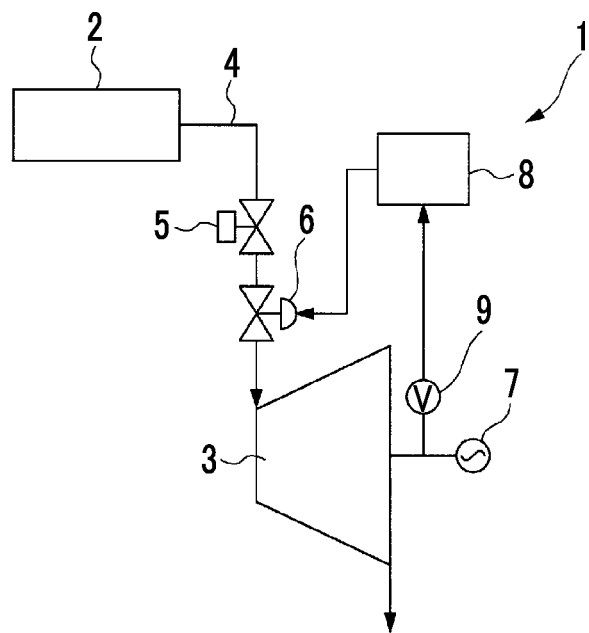
FIG. 1 is an explanatory drawing illustrating the arrangement of a stop valve and a multi-valve-type steam valve in a steam turbine according to an embodiment of the present invention.

Firstly, a steam turbine 1 to which a multi-valve-type steam valve 6 according to this embodiment is applied will be described. As illustrated in FIG. 1, a main steam header pipe 2, which supplies steam to the steam turbine 1, is connected to a turbine main body 3 of the steam turbine 1 via a steam supply passage 4. A stop valve 5 and the multi-valve-type steam valve 6, which is a steam control valve, are disposed in the steam supply passage 4. The supply of the steam to the turbine main body 3 is blocked when the stop valve 5 is fully closed or the flow rate at which the steam is supplied is controlled by the multi-valve-type steam valve 6.

A rotor of the steam turbine 1 transmits rotational energy to a machine such as a generator 7 (or a compressor). The steam turbine 1 is controlled by a governor 8 (control device). The governor 8, which is a computing device that controls the steam turbine 1, is configured, for example, to control the multi-valve-type steam valve 6 based on the rotation speed of the rotor of the turbine that is input by using a speed detector 9.

Figure 2:
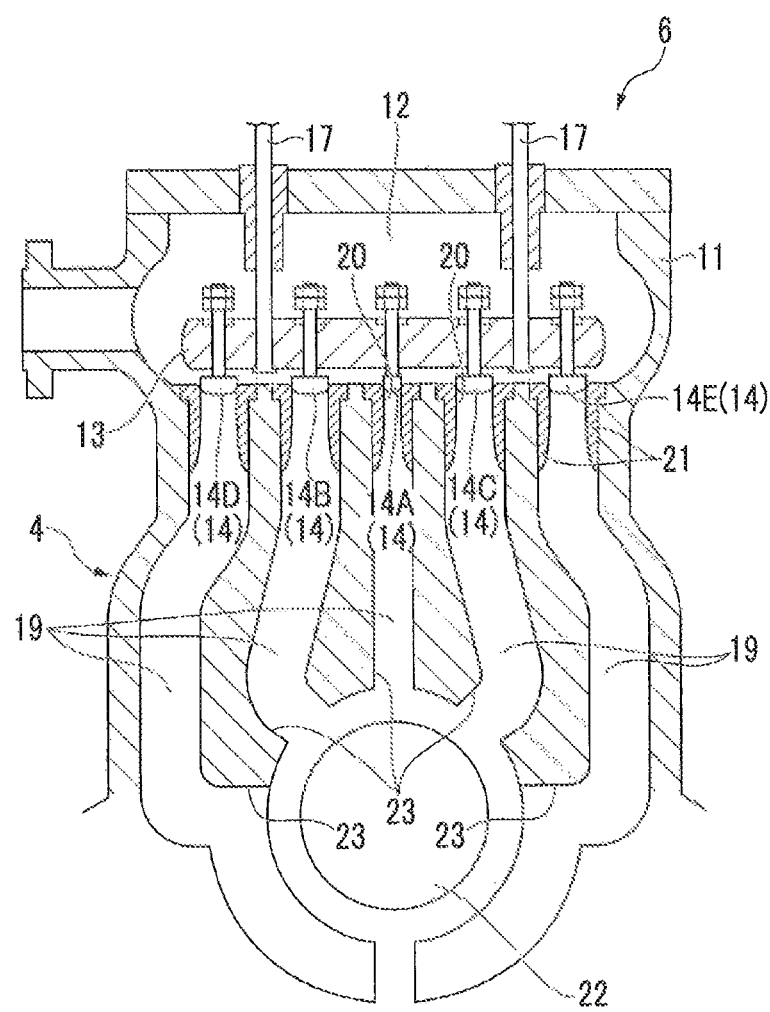
FIG. 2 is a schematic sectional view of a steam turbine valve chest according to a first embodiment of the present invention.

As illustrated in FIG. 2, the multi-valve-type steam valve 6 has a casing 11 where a steam chamber 12 to which the steam is supplied is formed, an inner bar 13 that is arranged in the steam chamber 12, a plurality of control valves 14 that are mounted on the inner bar 13, and two supporting rods 17 that support the inner bar 13 through the casing 11. The multi-valve-type steam valve 6 is also referred to as an inner bar valve because the multi-valve-type steam valve 6 uses the inner bar to support the control valves.

The steam chamber 12 is a space that is long in one direction. A plurality of (five in this embodiment) steam passages 19 constitute the steam supply passage 4 that connects the steam chamber 12 and the steam turbine 1 to each other. Upstream-side end portions of the respective steam passages 19 are arranged at predetermined intervals in the longitudinal direction of the steam chamber 12, and valve seats 21 are formed in opening portions 20 on the steam chamber 12 side. Valve bodies 15 of the control valves 14 abut against the valve seats 21.

Downstream-side end portions of the respective steam passages 19 are open toward a vehicle passenger compartment 22 of the steam turbine 1. Opening portions on the vehicle passenger compartment 22 side are arranged at predetermined intervals in the circumferential direction of the outer periphery of the vehicle passenger compartment 22. In this embodiment, the outer periphery of the vehicle passenger compartment 22 is divided into five regions and the steam passages 19 are connected to the respective regions.

Figure 3:
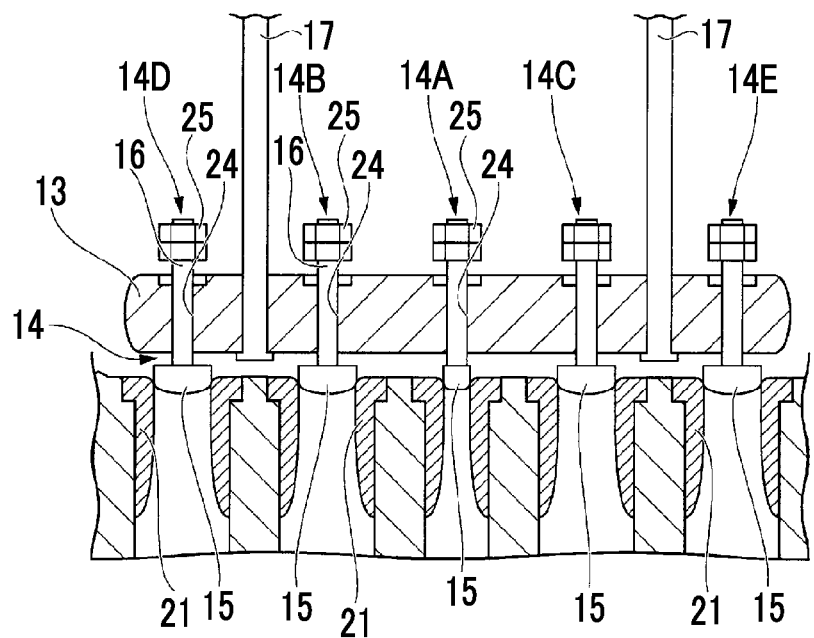
FIG. 3 is an assembly drawing of a multi-valve-type steam valve according to the first embodiment of the present invention.

As illustrated in FIG. 3, the plurality of control valves 14 that are mounted on the inner bar 13 have the valve bodies 15 that abut against the valve seats 21 and valve shafts 16 that extend upward from the valve bodies 15.

The inner bar 13 is a rod-shaped member that is supported by the supporting rods 17 which have a degree of opening controlled by the governor 8 and is long in the longitudinal direction of the steam chamber 12. The inner bar 13 is arranged above the valve seats 21 in the direction in which the plurality of valve seats 21 are arranged. Valve shaft holes 24, into which the valve shafts 16 of the control valves 14 are inserted, are bored in the inner bar 13.

When the valve shafts 16 are driven in one direction, the valve bodies 15 of the control valves 14 are gradually separated from the valve seats 21. Then, the flow path is widened.

Male screw grooves are formed in at least the upper outer peripheral surfaces of the valve shafts 16 and nuts 25 are screwed thereinto.

The supporting rods 17, which are rod-shaped members that extend upward from the inner bar 13, can be operated in a vertical direction by a driving device (not illustrated) such as an electro-hydraulic actuator.

The multi-valve-type steam valve 6 that has the configuration described above is configured as follows. When the inner bar 13 is moved in the vertical direction by the supporting rods 17 being operated, the nuts 25 are lifted and the valve bodies 15 of the control valves 14 are separated (forward/backward) from the valve seats 21. Then, the steam in the steam chamber 12 is allowed to flow into the vehicle passenger compartment 22 of the steam turbine 1. The timing of the separation of the control valves 14 from the valve seats 21 can be adjusted depending on the positions of the nuts 25.

This embodiment is configured for the valve bodies 15 of the control valves 14 to be driven by the lifting of the nuts 25. However, the present invention is not limited thereto. For example, diameter-enlarged portions may be disposed above the valve shafts 16 and the positions of the respective diameter-enlarged portions may be altered with the respective control valves 14.

This embodiment is set as follows. When the inner bar 13 is moved upward, a central first control valve 14A is opened first among the five control valves 14. Then, a second control valve 14B, which is one of those positioned next to the first control valve 14A, is opened. Then, a third control valve 14C, which is the other one next to the first control valve 14A positioned in the opposite direction, is opened. Then, a fourth control valve 14D at one end is opened. Lastly, the remaining fifth control valve 14E is opened.

As the first control valve 14A is opened first, the steam flows into the vehicle passenger compartment 22 via the opening portion 20 previously closed by the first control valve 14A, and the steam flows in order into the vehicle passenger compartment 22 via the other opening portions 20 as the output increases. The plurality of opening portions 20 are configured to reach the maximum flow rate in a stage where all of the control valves 14 are in an open state.

The valve bodies 15 are pulled toward the valve seats 21 by steam power. Accordingly, the opening and closing of the valves are performed as planned with the plurality of valve bodies 15 seated in order on the valve seats 21 in response to upward and downward movements of the inner bar 13.

Regarding the plurality of control valves 14 according to this embodiment, only the first control valve 14A is shaped to have a steam inflow amount for reaching the open state that is smaller than those of the other control valves 14. Specifically, the first control valve 14A is smaller in size than the other control valves 14 and the valve body 15 of the first control valve 14A is smaller in outer shape than those of the other control valves 14. In response, the valve seat 21 against which the valve body 15 of the first control valve 14A abuts is formed to have a smaller inner diameter.

In another possible configuration, the steam inflow amount of the first control valve 14A may be decreased by decreasing the inner diameter of the corresponding valve seat 21 without changing the size of the valve body 15.

The steam is guided into the steam turbine 1 by using mainly the first control valve 14A, because of a small output, when the steam turbine 1 in a stop state is started. In this case, a warm-up operation is performed by gradually opening the first control valve 14A. At the point in time when the steam turbine 1 reaches a rated speed and the warm-up is completed, the inner bar 13 is further raised and the guiding of the steam from the other control valves 14 is performed.

Figure 4:
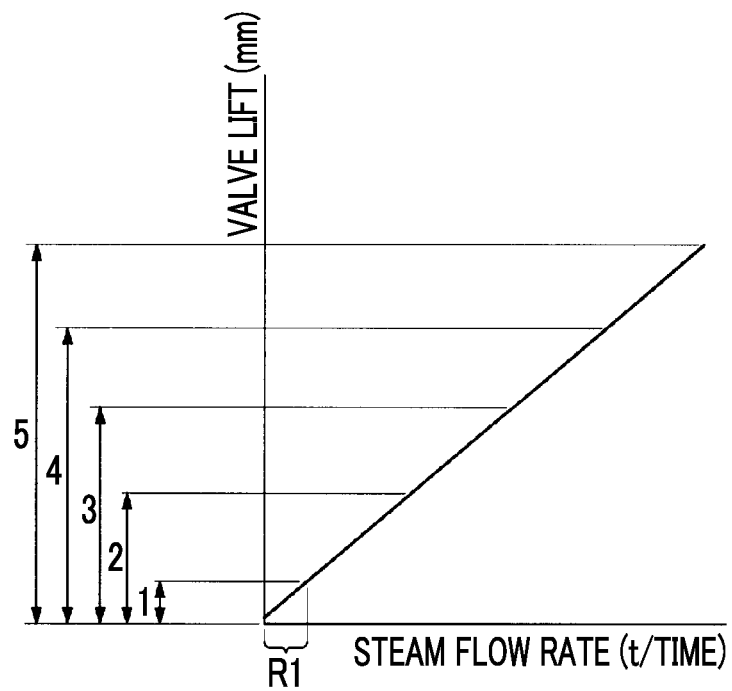
FIG. 4 is a graph illustrating a relationship between a steam flow rate and a valve lift amount regarding a steam turbine according to the first embodiment of the present invention.

FIG. 4 is a graph illustrating a relationship between the steam flow rate and a valve lift amount (valve lift). The numbers of one to five in the graph show which one of the control valves 14 among the first control valve 14A to the fifth control valve 14E is lifted at a corresponding lift amount.

According to the embodiment described above, the steam flow rate R1 of the first control valve 14A from the fully-closed state to the fully-open state decreases as illustrated in FIG. 4 since the first control valve 14A is small in size. In other words, controllability of the multi-valve-type steam valve 6 during fine speed adjustment is improved because of the narrow flow rate range of the first control valve 14A.

The driving force for the operation of the first control valve 14A can be reduced since the valve body 15 of the first control valve 14A is small in size. In other words, the thrust force of the steam that is applied to the valve body 15 decreases since the valve body 15 is small in size, and thus the power for the driving of the valve body 15 can be reduced.

The first control valve 14A is the valve that is opened first among the plurality of control valves 14, and thus the pressure difference between the steam chamber 12 and the vehicle passenger compartment 22 is large and the reduction in size is highly effective. When the first control valve 14A reaches the open state, the steam flows into the vehicle passenger compartment 22 of the steam turbine 1. Accordingly, the pressure difference between the vehicle passenger compartment 22 and the steam chamber decreases. Accordingly, no large driving force is required during the driving of the other control valves 14.

Second Embodiment

Hereinafter, a multi-valve-type steam valve 6B according to a second embodiment of the present invention will be described with reference to accompanying drawings. The following description of this embodiment will focus on how this embodiment differs from the first embodiment, and description of similar parts will be omitted.

Figure 5:
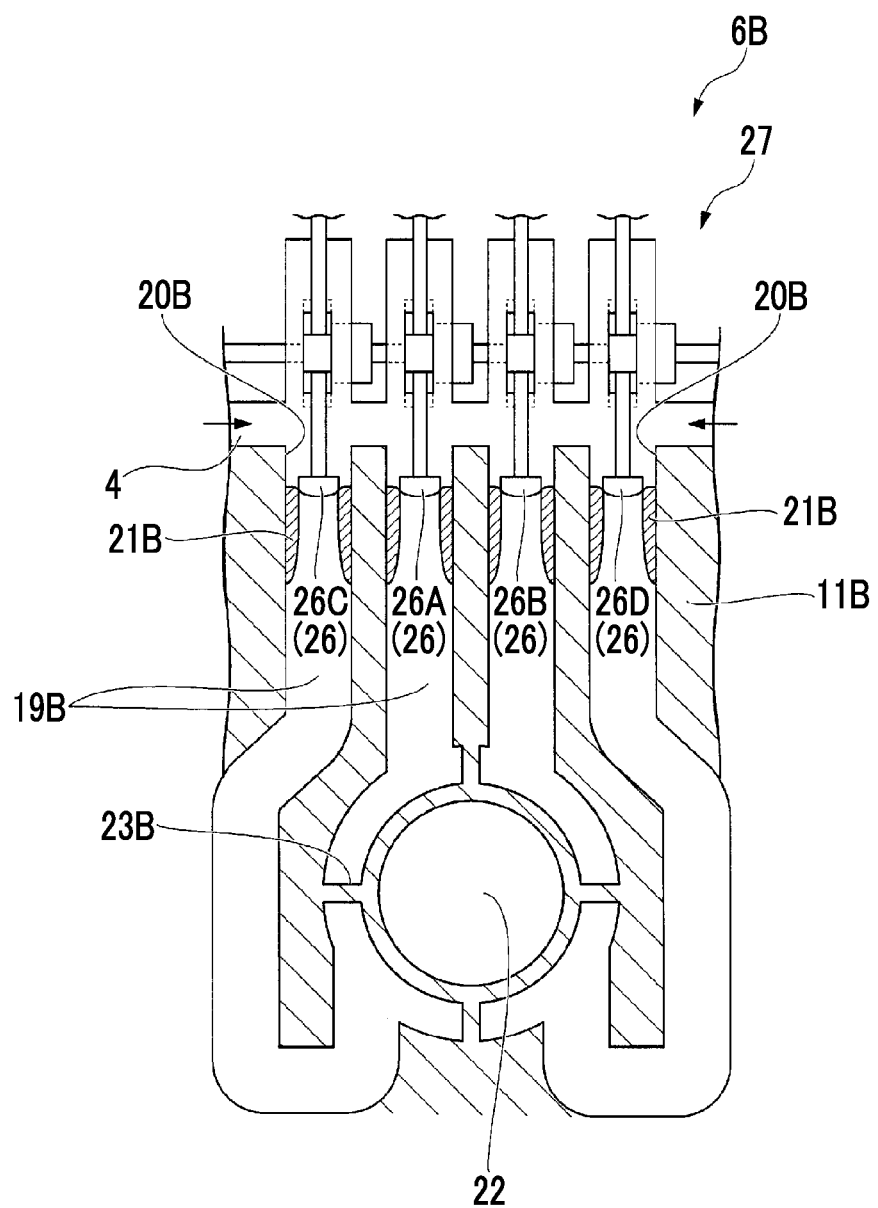
FIG. 5 is a schematic diagram of a steam turbine valve chest according to a second embodiment of the present invention.
Figure 6:
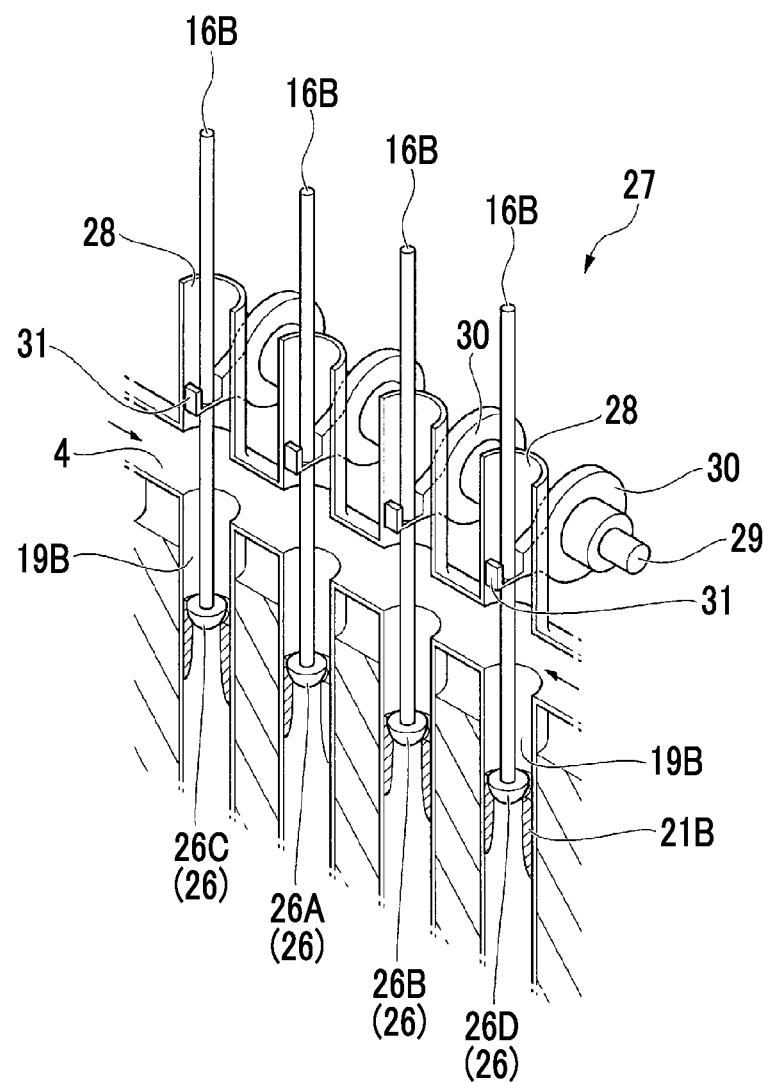
FIG. 6 is a perspective view showing a control valve drive mechanism of a steam turbine according to the second embodiment of the present invention.

As illustrated in FIGS. 5 and 6, the multi-valve-type steam valve 6B according to this embodiment has a casing 11B where a plurality of (four in this embodiment) pipes 19B branching from the steam supply passage 4 are formed, valve seats 21B that are disposed in the respective pipes 19B, a plurality of control valves 26 that are disposed in response to the valve seats 21B, and a control valve drive mechanism 27 that drives each of the control valves 26. This multi-valve-type steam valve is driven with independent supporting rods instead of an inner bar, and thus is referred to as an independent valve.

Upstream-side end portions of the pipes 19B that connect the steam supply passage 4 and the vehicle passenger compartment 22 to each other are arranged at predetermined intervals in the direction in which the steam supply passage 4 extends. The valve seats 21B are formed in the vicinity of opening portions 20B. Valve bodies 32 of the control valves 26 abut against the valve seats 21B.

Downstream-side end portions of the respective pipes 19B are open toward the vehicle passenger compartment 22 of the steam turbine 1. Opening portions 23B on the vehicle passenger compartment 22 side are arranged at predetermined intervals in the circumferential direction of the outer periphery of the vehicle passenger compartment 22. In this embodiment, the outer periphery of the vehicle passenger compartment 22 is divided into four regions and the pipes 19B are connected to the respective regions.

As illustrated in FIG. 6, the control valve drive mechanism 27 has a plurality of valve chests 28 that accommodate the valve shafts 16 of the respective control valves 14, a connecting arm 29 that extends to be orthogonal to the plurality of valve chests 28, and cam levers 30 that are mounted on the connecting arm 29 in response to the plurality of valve chests 28. A driving device (not illustrated) can rotate the connecting arm 29 that is a rod-shaped member which can be controlled by the governor 8.

The cam levers 30 and valve shafts 16B in the valve chests 28 are connected to each other by connecting rods 31. The angle of the cam levers 30 is adjusted so that the control valves 14 reach an open state in a predetermined order.

The multi-valve-type steam valve 6 that has the configuration described above is configured as follows. When the connecting arm 29 is operated and the cam levers 30 are allowed to rotate, the respective valve shafts 16B are driven and the steam in the steam supply passage 4 is allowed to flow into the vehicle passenger compartment 22 of the steam turbine 1.

This embodiment is set as follows. When the connecting arm 29 is allowed to rotate, a first control valve 26A close to the center is opened first among the four control valves 26. Then, a second control valve 26B, which is also close to the center, is opened. Then, a third control valve 26C at one end is opened. Lastly, the remaining fourth control valve 26D is opened. As the first control valve 26A is opened first, the steam flows into the vehicle passenger compartment 22 via the opening portion 20B previously closed by the first control valve 26A, and the steam flows in order into the vehicle passenger compartment 22 via the other opening portions 20B as the output increases. The plurality of opening portions 20B are configured to reach the maximum flow rate in a stage where all of the control valves 26 are in an open state.

Figure 7:
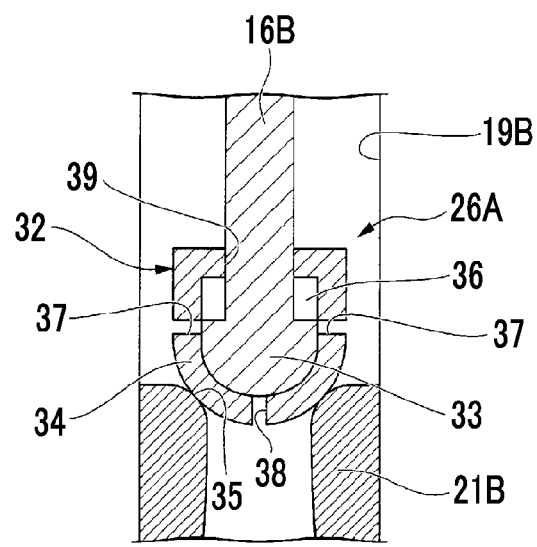
FIG. 7 is a schematic sectional view illustrating a control valve according to the second embodiment of the present invention.

As illustrated in FIG. 7, the valve body 32 of the first control valve 26A according to this embodiment has a pilot valve 33 that is connected to the valve shaft 16B and a main valve 34 that is a valve body main body abutting against the valve seat 21B. The main valve 34, which is a region that forms the outer shape of the valve body 32, has a valve seat abutting portion 35 abutting against the valve seat 21B. A pilot valve accommodation space 36, which accommodates the pilot valve 33, is formed in the main valve 34. The valve seat abutting portion 35 of the main valve 34 is a circular region that seals the upstream side and the downstream side of the pipe 19B by abutting against the valve seat 21.

A plurality of steam guide holes 37, through which the pilot valve accommodation space 36 is connected to the outside of the main valve 34, and a steam discharge hole 38 are formed in the main valve 34. The steam guide holes 37 and the steam discharge hole 38 communicate with each other via the pilot valve accommodation space 36.

The steam guide holes 37 are a plurality of holes through which the pilot valve accommodation space 36 is connected to a side surface of the main valve 34. The steam guide holes 37 are formed on the upstream side of the valve seat abutting portion 35 in the outer surface of the main valve 34.

The steam discharge hole 38 is a hole through which the pilot valve accommodation space 36 is connected to a tip of the main valve 34. The steam discharge hole 38 is formed on the downstream side of the valve seat abutting portion 35 in the outer surface of the main valve 34.

The pilot valve 33 is accommodated in the main valve 34 in a state where a vertical-direction movement in the pilot valve accommodation space 36 is allowed by the driving of the valve shaft 16B. The valve shaft 16B extends above the main valve 34 via a valve shaft hole 39 formed in the main valve 34.

As illustrated in FIG. 8, the pilot valve 33 and the pilot valve accommodation space 36 are formed to be capable of sealing the steam guide holes 37 and the steam discharge hole 38 or allowing the steam guide holes 37 and the steam discharge hole 38 to communicate with each other depending on the positions thereof.

Figures 8A, 8B, 8C:
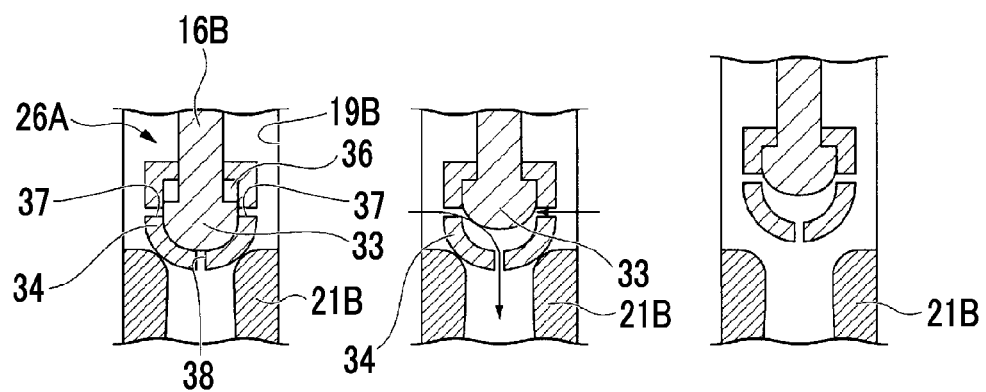
FIG. 8 is a diagram showing an effect of the control valve according to the second embodiment of the present invention.

Specifically, the steam guide holes 37 and the steam discharge hole 38 are blocked by the pilot valve 33 when the pilot valve 33 is on a lower side of the pilot valve accommodation space 36 as illustrated in FIG. 8A. The steam guide holes 37 and the steam discharge hole 38 communicate with each other when the pilot valve 33 is on an upper side of the pilot valve accommodation space 36 as illustrated in FIG. 8B.

The steam is guided into the steam turbine 1 by using mainly the first control valve 26A, because of a small output, when the steam turbine 1 in a stop state is started. In a state prior to the steam guiding, the main valve 34 abuts against the valve seat 21B and the steam guide holes 37 and the steam discharge hole 38 are sealed by the pilot valve 33 as illustrated in FIG. 8A. In other words, the pilot valve 33 is at a position below the pilot valve accommodation space 36, and thus the steam in the steam supply passage 4 (refer to FIG. 5) does not flow into the pipe 19B.

When the valve shaft 16B of the first control valve 26A is driven upward by the cam lever 30 (refer to FIG. 6) correlated with the first control valve 26A, the pilot valve 33 is moved upward in the pilot valve accommodation space 36 and the steam guide holes 37 and the steam discharge hole 38 are released to communicate with each other while the main valve 34 abuts against the valve seat 21B as illustrated in FIG. 8B.

The amount of the steam that flows into the pipe 19B from the steam supply passage 4 in this case is smaller than the amount of the steam that is allowed to flow by the main valve 34 being separated from the valve seat 21B.

Hereinafter, the hole diameters of the steam guide holes 37 and the steam discharge hole 38 and the number of the steam guide holes 37 will be described. The hole diameters and the number of the steam guide holes 37 are appropriately set in accordance with the amount of the steam that is required in the state illustrated in FIG. 8B where the steam flows in only through the steam guide holes 37 and the steam discharge hole 38.

Then, the valve shaft 16B is driven upward, the main valve 34 is lifted by the pilot valve 33, and the main valve 34 (valve body 32) and the valve seat 21B are separated from each other. Then, more steam flows into the vehicle passenger compartment 22 via the pipe 19B. At the point in time when the steam turbine 1 reaches a rated speed and warm-up is completed, the connecting arm 29 is allowed to further rotate and the guiding of the steam from the other control valves 26 is performed.

Figure 9:
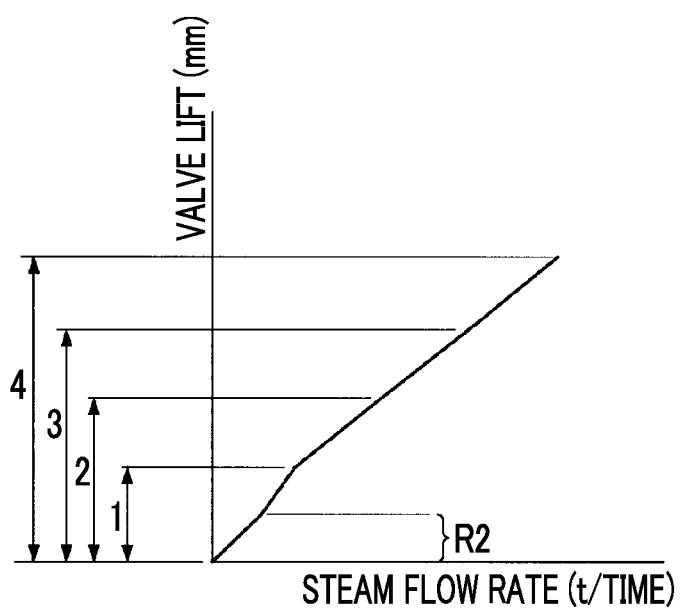
FIG. 9 is a graph illustrating a relationship between a steam flow rate and a valve lift amount regarding the steam turbine according to the second embodiment of the present invention.
Figure 10:
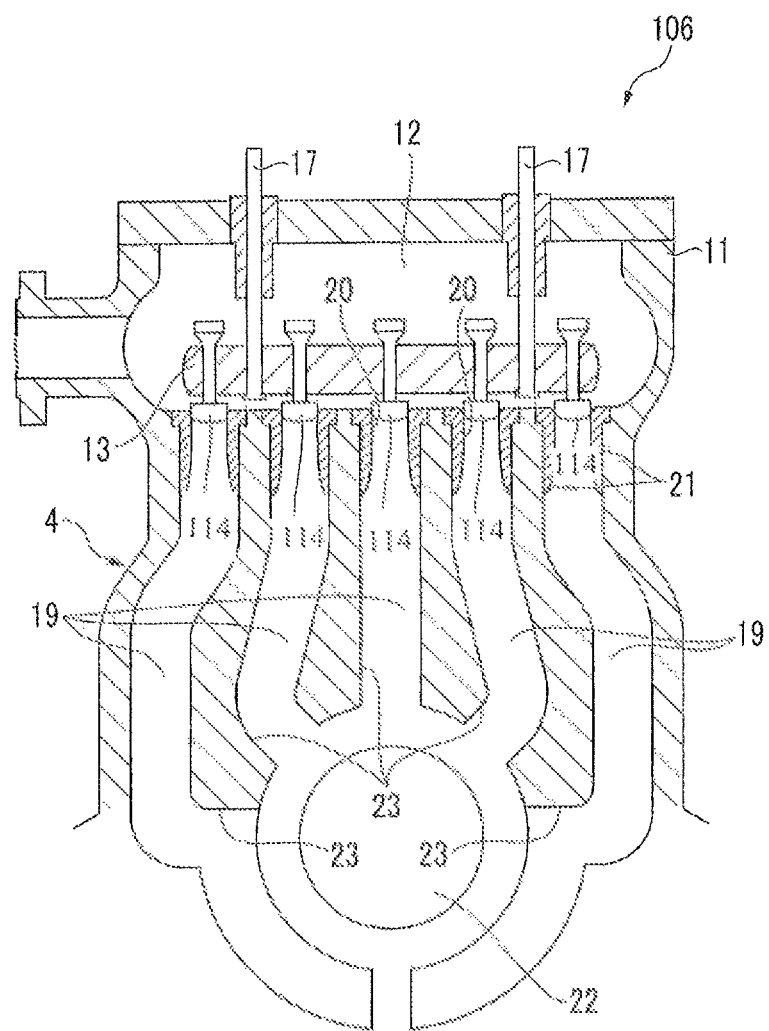
FIG. 10 is a schematic sectional view of a steam turbine valve chest according to the related art.

FIG. 9 is a graph illustrating a relationship between the steam flow rate and a valve lift amount (valve lift). The numbers of one to four in the graph show which one of the control valves 26 among the first control valve 26A to the fourth control valve 26D is lifted at a corresponding lift amount.

According to the embodiment described above, the main valve 34 and the pilot valve 33 constitute the first control valve 26A, and thus the flow rate in a stage where control is performed by the pilot valve 33 can be decreased and fine speed adjustment is facilitated.

In other words, the control by the pilot valve 33 is allowed as illustrated in FIG. 9. In a range R2, where the control by the pilot valve 33 is performed, the range of the flow rate of the first control valve 26A with respect to the valve lift can be narrowed, and controllability of the multi-valve-type steam valve 6B during fine speed adjustment is improved.

The technical scope of the present invention is not limited to the embodiments described above, and various modifications can be added thereto without departing from the spirit of the present invention. The features that have been described in the plurality of embodiments described above may be combined with each other in any form. In other words, the valve body of the control valve of the inner bar valve may be a valve body that has the main valve and the pilot valve according to the second embodiment. In addition, the valve body of the control valve of the independent valve may be reduced in size.

In the embodiments described above, only the first control valves 14A and 26A are shaped to decrease the steam inflow amount. However, the present invention is not limited thereto, and the other control valves 14 and 26 may be shaped to decrease the steam inflow amount.

REFERENCE SIGNS LIST

1 Steam turbine
2 Main steam header pipe
3 Turbine main body
4 Steam supply passage
5 Stop valve
6 Multi-valve-type steam valve
7 Generator (compressor)
8 Governor
9 Speed detector
11 Casing
12 Steam chamber
13 Inner bar
14 Control valve
14A First control valve
14B Second control valve
14C Third control valve
14D Fourth control valve
14E Fifth control valve
15 Valve body
16 Valve shaft
17 Supporting rod
19 Steam passage
20 Opening portion
21 Valve seat
22 Vehicle passenger compartment
23 Opening portion
24 Valve shaft hole
25 Nut
26 Control valve
26A First control valve
26B Second control valve
26C First control valve
26D Fourth control valve
26E Fifth control valve
27 Control valve drive mechanism
28 Valve chest
29 Connecting arm
30 Cam lever
31 Connecting rod
32 Valve body
33 Pilot valve
34 Main valve (valve body main body)
35 Valve seat abutting portion
36 Pilot valve accommodation space
37 Steam guide hole
38 Steam discharge hole

The invention claimed is:

1. A multi-valve steam valve, comprising:
a casing where a steam chamber to which the steam is supplied,
a steam supply passage that is connected to a lower side of the steam chamber and is constituted by a plurality of steam passages each having an opening portion that opens in the steam chamber,
a plurality of control valves each of which includes a valve seat formed in the opening, a valve body which is capable of abutting the valve seat and a valve shaft extending upward from the valve body, each of the plurality of control valves widening a flow path as the valve body thereof is separated from the valve seat thereof by driving the valve shaft thereof in a direction of an open state of each of the plurality of control valves,
wherein steam is allowed to flow into the steam supply passage from the steam chamber by allowing the plurality of control valves to reach the open state in order,
wherein that the plurality of control valves include at least a first control valve that reaches the open state first among the plurality of control valves,
wherein the first control valve has a smaller steam inflow amount when being driven in the upward direction from a closed state than the other control valves of the plurality of control valves,
wherein the valve body of at least the first control valve has
a pilot valve connected to the valve shaft of the first control valve, and
a valve body main body having an outer surface which can abut the valve seat of the first control valve, an inner surface defining a space in the valve body main body, a steam guide hole that is formed through the valve body main body and opens on the inner surface and on the outer surface, and a steam discharge hole that is formed through the valve body main body and opens on the inner surface and on the outer surface, the space accommodating the pilot valve,
wherein the pilot valve blocks the steam guide hole and the steam discharge hole in the closed state,
wherein the upstream-side flow path and the downstream-side flow path communicate with each other via the space by driving the valve shaft of the first control valve in the upward direction from the closed state, while having the outer surface of the valve body main body abut the valve seat, to release blocking of the steam guide hole and the steam discharge hole by the pilot valve, and
wherein the pilot valve further lifts the valve body of the first control valve to be separated from the valve seat of the first control valve when the valve shaft of the first control valve is further driven in the upward direction.

2. The multi-valve steam valve according to claim 1,
wherein the valve body of at least the first control valve is smaller in diameter than the valve bodies of the other control valves of the plurality of control valves and is formed for the steam inflow amount to be decreased.

3. The multi-valve steam valve according to claim 2,
wherein the valve shaft of each of the plurality of control valves passes from below through a valve shaft hole bored in an inner bar arranged in the flow path, and
wherein a diameter-enlarged portion formed above the valve shaft of each of the plurality of control valves is lifted via the inner bar and the valve body is allowed to be moved forward and backward with respect to the valve seat so that the steam flows in.

4. The multi-valve steam valve according to claim 2, further comprising a connecting arm arranged outside the flow path and having a plurality of cams driving the valve shafts of the plurality of control valves and,
wherein the steam is allowed to flow in by rotating the connecting arm.

5. A steam turbine comprising the multi-valve steam valve according to claim 2.

6. The multi-valve steam valve according to claim 1,
wherein the valve shaft of each of the plurality of control valves passes from below through a valve shaft hole bored in an inner bar arranged in the flow path, and wherein a diameter-enlarged portion formed above the valve shaft of each of the plurality of control valves is lifted via the inner bar and the valve body of each of the plurality of control valves is allowed to be moved forward and backward with respect to the valve seat so that the steam flows in.

7. A steam turbine comprising the multi-valve steam valve according to claim 6.

8. The multi-valve steam valve according to claim 1, further comprising a connecting arm arranged outside the flow path and having a plurality of cams driving the valve shafts of the plurality of control valves and,
wherein the steam is allowed to flow in by rotating the connecting arm.

9. A steam turbine comprising the multi-valve steam valve according to claim 8.

10. A steam turbine comprising the multi-valve steam valve according to claim 1.

* * * * *